US008297978B2

(12) United States Patent
Sanet

(10) Patent No.: US 8,297,978 B2
(45) Date of Patent: Oct. 30, 2012

(54) METHOD FOR LEARNING CHINESE CHARACTER SCRIPT AND CHINESE CHARACTER-BASED SCRIPTS OF OTHER LANGUAGES

(76) Inventor: Morton J. Sanet, North Miami Beach, FL (US)

( * ) Notice: Subject to any disclaimer, the term of this patent is extended or adjusted under 35 U.S.C. 154(b) by 866 days.

(21) Appl. No.: 11/443,568

(22) Filed: May 31, 2006

(65) Prior Publication Data

US 2006/0293878 A1     Dec. 28, 2006

Related U.S. Application Data

(60) Provisional application No. 60/687,566, filed on Jun. 3, 2005.

(51) Int. Cl.
*G09B 19/06* (2006.01)
(52) U.S. Cl. ...................................... 434/157
(58) Field of Classification Search .......... 434/156–157, 434/169
See application file for complete search history.

(56) References Cited

OTHER PUBLICATIONS

Lee, Philip Y. "A Chinese Character a Day" 2004 p. 2-3.*
Guenberg "Spanihs by Association 1994" p. 7.*
"Chinese Literature: 214 Radicals" <retreived from the Internet at Mar. 6, 2004> <Retrieved from: http://web.archive.org/web/20040603164500/http://www.chinaknowledge.de/Literature>.*
Heisig, James. "Remembering the Kanji vol. I" Japan Publications Trading Company; 4 edition (Aug. 2001).*
Kuo et al. "The Effects of Visual and Verbal Coding Mnemonics on Learning Chinese Characters in Computer-Based Instruction" ETR& D, vol. 52, No. 3, 2004, pp. 23-34.*
"Reading & Writing Chinese, Simplified Character Edition", William McNaughton, Third Edition, Tuttle Language Library, inside front and back covers.

* cited by examiner

*Primary Examiner* — Robert J Utama
(74) *Attorney, Agent, or Firm* — Mayback & Hoffman, P.A.; Gregory L. Mayback

(57) ABSTRACT

A method for learning scripts of Chinese character-based languages includes forming a list of user-recognized symbols in a Chinese character-based language, each of the symbols having an associated key with a respective bridge. A complex Chinese multi-character to be learned and added to the recognized list is identified. A set of the user-recognized symbols within the multi-character is recognized. A mnemonic in a language known to the user is formed for recalling the written form of the multi-character. The mnemonic is based upon the keys and bridges associated with the recognized set of symbols within the multi-character. The mnemonic is used to remember the multi-character and, thereby, add the multi-character to the recognized list. Chinese radicals can be sources associated with icons having a logical similarity thereto. The source has the bridge in upper case and three icons use two combinations of lower/upper case and two lower case letters.

17 Claims, 23 Drawing Sheets

BE 生

Think of these: be, because, became, become, before, behalf, behind, being, beneath, beside(s), best, better, between.

| | | | | |
|---|---|---|---|---|
| be | bed | befriend | belles-lettres | berry |
| beach | bedazzle | befuddle | bellhop | berserk |
| beachbum | bedazzlement | beget | bellicose | berth |
| beachcomber | bedbug | beggar | belligerent | beryl |
| beachhead | bedclothes | beggarly | bellow | beryllium |
| beacon | bedding | begin | bellwether | beseech |
| bead | bedeck | beginner | belly | beset |
| beading | bedevil | begone | belong | beside |
| beadle | bedfellow | begonia | belongings | besides |
| beady | bedlam | begrime | beloved | besiege |
| beagle | bedouin | begrudge | below | besmirch |
| beaker | bedpartner | beguile | belttighten | besotted |
| beanie | bedraggled | begum | beltway | bespangle |
| bear | bedridden | behalf | bemire | bestial |
| bearable | bedrock | behave | bemoan | bestiality |
| beardless | bedroll | behavior | bemuse | bestiary |
| bearer | bedroom | behavioral | bend | bestir |
| bearing | bedside | behaviorist | benday | bestow |
| bearish | bedsore | behead | beneath | bet |
| bearskin | bedspread | behemoth | benediction | beta |
| beastly | bedstead | behest | benefaction | bete-noire |
| beat | bedtime | behind | benefactor | betray |
| beatific | beech | behold | beneficent | betrayal |
| beatify | beechnut | beholden | beneficial | betrayer |
| beatitude | beef | beholder | beneficiary | betroth |
| beatnik | beefcake | behoove | benefit | betrothal |
| beau | beefsteak | beige | benevolence | better |
| beau-monde | beefy | being | benevolent | betterment |
| beaujolais | beehive | beknight | benighted | bettor |
| beauteous | beekeeper | belabor | benign | between |
| beautician | beekeeping | belated | benthos | betwixt |
| beautiful | beeline | belch | benumb | bevel |
| beautify | beer | beleaguer | benzene | beverage |
| beauty | beery | belfry | benzoic | bevy |
| beaver | beeswax | belgium | benzoin | bewail |
| becalm | beetle | belie | bequeath | beware |
| became | befall | belief | bequest | bewilder |
| because | befit | believe | berate | bewitch |
| beckon | befog | belittle | bereave | beyond |
| becloud | before | belladonna | beret | bezel |
| become | beforehand | bellboy | beriberi | |
| becoming | | | | |

| | | | | |
|---|---|---|---|---|
| abbey | amber | babel | blueberry | camber |
| abed | ambergris | backbencher | bobbed | camembert |
| aberrant | antebellum | barbecue | bombed | cerebellum |
| abet | antechamber | barbell | boob-tube | chamber |
| abeyance | arabesque | barber | bribe | chambermaid |
| absorbent | asbestos | barbershop | bribetaker | childbearing |
| adobe | ascribe | bathrobe | bride-to-be | clabber |
| adsorb | aslumber | big-ben | browbeat | clamber |
| aerobe | astrolabe | blabber | bugbear | climber |
| albeit | babe | blabbermouth | bumblebee | clobber |
| alphabet | babe-ruth | blubber | caliber | clubber |

| | | | | |
|---|---|---|---|---|
| cobwebbed | flabbergast | liberal | renumber | tabernacle |
| cowbell | flambeau | libertine | resorbed | test-tube |
| crabbedly | flubbed | liberty | reverberate | throbber |
| cranberry | forbear | limber | roadbed | thumbed |
| cube | freebee | lobbed | robber | tibet |
| cucumber | frisbee | lobe | robe | timber |
| cumbent | gabbed | lube | root-beer | timber-wolf |
| cumbersome | gaberdine | lumber | rubbed | timberjack |
| cupbearer | globe | lumberjack | rubber | timberland |
| curbed | go-between | make-believe | rubberneck | to-be |
| dabbed | gobelet | maybe | rubberstamp | torchbearer |
| daube | gobelin | member | rubella | tribe |
| deadbeat | goober | microbe | saber | tube |
| deathbed | grabbed | misbeget | sabertoothed | tuber |
| december | gunbearer | misbehave | scabbed | unabetted |
| decibel | habeas-corpus | mislabel | scribe | unabsorbed |
| deliberate | haberdasher | misnumber | -scribed | unbarbed |
| describe | hartebeest | mobbed | scrubbed | unbearable |
| diabetes | heartbeat | moneygrubber | seabee | unbeaten |
| diatribe | hellbent | moonbeam | seedbed | unbecoming |
| dismember | hibernate | nabbed | september | unbeknownst |
| disobey | hobnobbed | november | sherbet | unbelief |
| disrobe | honeybee | number | shrubbery | unbend |
| disturbed | honeycomb | numberless | sickbed | unbending |
| doberman | hoofbeat | obedient | slabbed | uncombed |
| doorbell | hotbed | obelisk | slobber | underbelly |
| downbeat | howbeit | obese | slumber | undisturbed |
| drubbed | iceberg | obey | snubbed | unembellished |
| drumbeat | ill-behaved | october | sobbed | unencumber |
| dubbed | imbecile | off-beat | sobeit | unlabeled |
| dumbbell | imbibe | outnumber | sober | unnumbered |
| earlobe | incumbent | overbearing | social-climber | unremembered |
| ebbed | inscribe | pallbearer | somber | upbeat |
| eggbeater | jabbed | perturbed | sorbet | vibe |
| embed | jabber | -phobe | soybean | wardrobe |
| embellish | jabberwocky | plumbed | st.-bernard | well-behaved |
| ember | jibe | plumber | stabber | well-being |
| embezzle | jobber | potbelly | strawberry | wife-to-be |
| encumber | jujube | prepuberty | strobe | wildebeest |
| exuberance | knabe | probe | stubbed | winebibber |
| fibbed | knobbed | protuberant | subbed | workbench |
| fibber | label | rebel | sunbeam | xebec |
| fiber | lambent | recumbent | supreme-being | xenophobe |
| fiberglass | landlubber | redbeard | swabbed | yellowbelly |
| firebombed | libel | remember | tabbed | yohimbe |

Can, can't

| | | | | |
|---|---|---|---|---|
| cabal | calamine | cambium | cannibal | capstan |
| cabana | calamitous | cambric | cannibalize | capsular |
| cabaret | calamity | camel | canniness | capsulate |
| cabbage | calcareous | camellia | cannon | capsule |
| cabby | calcification | camembert | cannonade | captain |
| cabin | calcify | cameo | cannonball | captaincy |
| cabinet | calcimine | camera | cannoneer | caption |
| cabinetmaker | calcination | camisole | cannot | captious |
| cabinetwork | calcine | camomile | canny | captivate |
| cable | calcium | camouflage | canoe | captivation |
| cablegram | calculable | campaign | canon | captive |
| cabman | calculate | campanile | canonical | captor |
| cabochon | calculating | camper | canonize | capture |
| caboose | calculation | camphor | canopy | capuchin |
| cabriolet | calculator | camphorate | cantabile | carabao |
| cabstand | calculus | camporee | cantaloupe | caracole |
| caca | caldron | campstool | cantankerous | carafe |
| cacao | calendar | campus | cantata | caramel |
| cache | calender | camshaft | canteen | carapace |
| cachet | calendrical | can | canter | carat |
| cackle | calends | can't | canticle | caravan |
| cacophonous | calf | canaille | cantilever | caravansary |
| cacophony | calfskin | canal | canton | caravel |
| cactus | caliber | canalize | cantonal | caraway |
| cadaver | calibrate | canape | cantonment | carbide |
| cadaverous | calico | canard | cantor | carbine |
| caddie | caliper | canary | canvas | carbohydrate |
| caddish | caliph | canasta | canvasback | carbolic |
| caddishness | caliphate | cancan | canvass | carbon |
| caddy | calisthenics | cancel | canyon | carbonate |
| cadence | calk | cancellous | caoutchouc | carbonation |
| cadenza | call-board | cancer | cap | carbonic |
| cadet | calla | cancerous | capability | carboniferous |
| cadge | callback | candelabrum | capable | carbonize |
| cadmium | caller | candescence | capacious | carboy |
| cadre | calligrapher | candescent | capacitance | carbuncle |
| caduceus | calligraphy | candid | capacitor | carburetor |
| caesar | calling | candidacy | capacity | carcass |
| caesura | calliope | candidate | caparison | carcinogen |
| café | callous | candied | caper | carcinoma |
| café-au-lait | callow | candle | capeskin | card-carrying |
| cafeteria | callus | candlelight | capillarity | cardamom |
| caffeine | calomel | candlepin | capillary | cardboard |
| caftan | caloric | candlestick | capital | cardiac |
| cagey | calorie | candlewick | capitalist | cardigan |
| caginess | calorimeter | candor | capitalize | cardinal |
| cahoots | calumet | candy | capitation | cardiogram |
| caisson | calumniate | canebrake | capitol | cardiograph |
| caitiff | calumnious | canine | capitulate | cardiography |
| cajole | calumny | canister | capon | cardiology |
| cajolement | calve | canker | capriccio | cardiovascular |
| cajolery | calypso | cankerous | caprice | careen |
| cajun | calyx | cankerworm | capricious | career |
| calabash | camaraderie | cannelcoal | capriole | carefree |
| calaboose | camber | cannery | capsize | careful |

| careless | carpeting | casserole | catarrh | catty-corner |
|---|---|---|---|---|
| caress | carport | cassette | catastrophe | catty |
| caret | carrel | cassia | catcall | catwalk |
| caretaker | carriage | cassino | catch | caucasian |
| careworn | carrier | cassock | catchall | caucus |
| carfare | carries | cast | catcher | caudal |
| cargo | carrion | cast-off | catchment | caught |
| carhop | carrot | cast-iron | catchpenny | cauliflower |
| caribbean | carrousel | castanets | catchword | caulk |
| caribou | carry | castaway | catchy | causal |
| caricature | carry-over | caste | catechism | causality |
| caricaturist | carry-on | castellated | catechize | causation |
| caries | carryall | caster | catechumen | causative |
| carillon | carsick | castigate | categorical | cause |
| carioca | cartage | casting | categorize | cause-celebre |
| carked | carte-blanche | castle | category | causerie |
| carload | cartel | castor | cater | causeway |
| carminative | cartilage | castrate | catercorner | caustic |
| carmine | cartogram | castration | caterer | cauterize |
| carnage | cartographer | casual | caterpillar | caution |
| carnal | carton | casualty | caterwaul | cautionary |
| carnality | cartoon | casuist | catfish | cautious |
| carnation | cartoonist | casuistic | catgut | cavalcade |
| carnauba | cartridge | casuistry | catharsis | cavalier |
| carnelian | cartwheel | casusbelli | cathartic | cavalry |
| carnival | carver | cat-o'-9-tails | cathedral | cavalryman |
| carnivore | caryatid | cat's-paw | catheter | cave-in |
| carol | casaba | cataclysm | cathode | caveat-emptor |
| carom | cascade | catacomb | catholic | caveman |
| carotene | cascara | catafalque | catholicity | cavern |
| carotid | casein | catalan | cation | cavernous |
| carousal | casement | catalepsy | catkin | caviar |
| carouse | cashcard | catalog | catlike | cavil |
| carpel | cashew | catalpa | catnap | cavity |
| carpenter | cashier | catalysis | catnip | cavort |
| carpentry | cashmere | catalyst | catsup | cavy |
| carpet | casino | catamaran | cattail | cayenne |
| carpetbag | casket | catapult | cattiness | cayuse |
| carpetbagger | cassava | cataract | cattle | |

| abacus | altercate | apolitical | astronomical | axiomatically |
|---|---|---|---|---|
| abdicate | ambuscade | apothecary | asymmetrical | azteca |
| abracadabra | america | applecart | atheistical | bacteriological |
| acacia | amicable | applicable | atheological | balletical |
| academic | amplification | applicant | atmospherical | bankcard |
| academy | analytically | arcade | atomical | barricade |
| acoustical | anatomical | arcane | atypical | basically |
| adjudicate | anecdotically | archaeological | audiocassette | |
| advocate | angelical | aristocratical | authenticate | |
| aerobically | anthropological | arithmetical | autocade | |
| aerodynamical | anticancer | arthritical | autocratical | |
| alcoholically | anticlerical | artistical | autoerotically | |
| algebraical | antiseptically | ascetical | autographical | |
| alley-cat | antitheological | ashcan | autohypnotic | |
| allocate | antithetical | asthmatical | automatical | |
| alpaca | apical | astrological | avocado | |
| alphabetical | apocalypse | astronautical | avocation | |

FIG. 5B

RIce ✳

| rial | riddance | right-wing | ringleader | risibility |
|---|---|---|---|---|
| rialto | riddle | righteous | ringlet | risible |
| riant | ride | rightful | ringmaster | risk |
| riata | rider | rightish | ringside | risky |
| rib | ridge | rightist | ringtail | risotto |
| ribald | ridicule | rightly | ringworm | risqué |
| ribaldry | ridiculous | righto! | rink | rissole |
| ribbing | riding | rigid | rinse | ritardando |
| ribbon | rife | rigidity | riot | rite |
| riboflavin | riffle | rigor | riotous | ritual |
| ribose | riffraff | rigor-mortis | rip | ritualistic |
| rice | riffs | rigorous | rip-off | ritz |
| ricer | rifle | rile | rip-roaring | ritzy |
| rich | rifleman | rill | | rival |
| riches | rift | rim | riparian | rivalry |
| richly | rig | rime | ripcord | rive |
| richter-scale | rigamarole | rimy | ripe | river |
| rickets | rigatoni | rind | ripen | river-boat |
| rickety | rigger | ring [jewel] | riposte | riverbank |
| rickrack | right-on | ring [encircle] | ripper | riverbed |
| rickshaw | right | ring! [rrrrrring!] | ripple | riverside |
| ricochet | right-angled | ring-necked | ripsnorter | rivet |
| ricotta | right-hand | ringfinger | rise | rivulet |
| rid | right-handed | ringer | riser | |

| abridge | ascribe | bettering | briquet | cherish |
|---|---|---|---|---|
| accessorize | aspirin | birthright | brisk | clarify |
| acrid | asterisk | blaring | brisket | clarinet |
| acrimony | astride | blubbering | bristle | clarity |
| actuarial | astringent | blueprint | britches | clattering |
| adrift | atmospheric | blundering | brittle | cluttering |
| adventurist | atrium | boarish | buggering | constrict |
| aerial | attribute | boorish | bullring | contribute |
| affright | auditorium | bowstring | bunkering | contrition |
| aggrieve | authoring | briar | burial | coriander |
| airier | authority | bribe | burrito | corridor |
| airstrip | authorize | brick | cabdriver | crematorium |
| alacrity | avarice | brickbat | cajoleries | crib |
| allegoric | aviatrix | bricklayer | calories | cricket |
| alright | babooneries | brickwall | capricious | crikey! |
| angrier | backfiring | bridal | capturing | crime |
| anterior | bacteria | bride | caribou | crimp |
| antiterrorist | badgering | bridegroom | caries | crimson |
| aperitif | bakeries | bridge | carillon | cringe |
| aphorism | ballerina | bridle | carriage | crinkle |
| appropriate | barbarian | brief | carrier | cripple |
| apricot | baritone | brier | carrion | crisis |
| aquamarine | barium | brigade | cartridge | crisp |
| arbitrarily | barricade | brigand | censuring | crisscross |
| aria | barrio | bright | centurion | critical |
| arid | bearing | brilliant | cesarian | critter |
| arise | bedridden | brim | chagrin | culprit |
| aristocrat | befriend | brimstone | chariot | curio |
| arithmetic | behaviorist | brindle | charism | curious |
| arrive | berries | bring | charitable | curriculum |
| arrivederci! | besprinkled | brink | charity | customarily |
| arterial | bestride | brio | cheerio! | daiquiri |

FIG. 6A

RIce

| | | | | |
|---|---|---|---|---|
| dairies | drivel | frigate | hoofprint | lowering |
| daring | driveway | fright | horizontal | lubricant |
| debride | drizzle | frigid | horrible | lumbering |
| debrief | drolleries | frill | horrid | lurid |
| debris | earring | fringe | humanitarian | luxuriant |
| declaring | earthshattering | frisky | humorist | lyric |
| decried | eccentric | frivolous | hurricane | mainspring |
| deferring | editorial | frizz | hurried | majority |
| defibrillate | eerie | furies | hybrid | malaria |
| deglamorize | egocentric | furious | ignoring | mannerism |
| deleterious | electric | futurism | illustrious | manuscript |
| delirious | emeritus | gagwriter | immaterial | margarine |
| demerit | empiric | galleria | immemorial | marigold |
| dentifrice | endangering | garish | imperil | marinate |
| deodorize | endocrine | garrison | imperioal | marionette |
| deprive | engineering | generic | imploring | mariposa |
| deride | enrich | ghostwriter | impoverish | marital |
| derision | enshrine | gibberish | impresario | marriage |
| derive | esoteric | girlfriend | imprint | material |
| derrick | euphoria | glaring | imprison | materiel |
| describe | excoriate | glorify | impurity | maturing |
| desiring | expatriate | goldbrick | incurring | maverick |
| despairing | experience | gorilla | indoctrinate | meanspirited |
| deteriorate | experiment | goriness | inebriate | memorial |
| deterring | exterior | grammarian | inferior | merit |
| detriment | extricate | gregarious | infringe | merrily |
| detritus | extrinsic | grid | inherit | midriff |
| dexterity | fabric | griddlecake | injuring | minority |
| diapering | factoring | grief | inquiries | mistrial |
| diatribe | familiarize | grill | inscribe | moisturize |
| differing | fathering | grim | inspiring | moribund |
| diphtheria | favorite | grimace | integrity | motoring |
| dirigible | febrile | grime | interfering | murdering |
| disappearing | festering | grin | interim | myriad |
| discovering | figurine | grinder | interior | naturist |
| discriminate | filibustering | grip | intricate | necessarily |
| disfavoring | filmstrip | gripe | intrigue | nectarine |
| disfiguring | fingering | grippe | intrinsic | nefarious |
| disinherit | fingerprint | grit | irrigate | neighboring |
| dismembering | flaring | guerilla | jabbering | newsprint |
| disorient | flavoring | hackdriver | jarring | nightmarish |
| disparity | flooring | hairier | jeering | nondescript |
| distribute | florid | hammering | jinricksha | nonnutritious |
| district | flourish | hamstring | jocularity | nonoriental |
| doctoring | folklorist | handgrip | joyride | nonprofessional |
| doctrine | footprint | handwreiting | jurist | nostril |
| dominatrix | forthright | hankering | knaveries | notarize |
| domineering | fostering | harridan | laboring | notoriety |
| downright | foundering | hayride | lariat | |
| drearier | fracturing | headshrinker | latrine | |
| dribble | fraticide | hearing | leering | |
| dried | friable | heartstring | lettering | |
| drift | friar | herisson | libertarian | |
| drifter | fricassee | herring | licorice | |
| drill | friction | herringbone | limerick | |
| drink | fridge | hilarious | lingerie | |
| drip | fried | hiring | loitering | |
| drive | friend | historian | lothario | |

| | | | | |
|---|---|---|---|---|
| stab | stannic | statute | stern | stockowner |
| stabile | stannous | statutory | sternum | stockpile |
| stable | stanza | staunch | steroid | stockroom |
| staccato | stapes | stave | stet | stocky |
| stack | staphylococcus | stay | stethoscope | stockyard |
| stadium | staple | steadfast | stetson | stodgy |
| staff | stapler | steady | stevedore | stoic |
| stag | star | steak | stew | stoicism |
| stage | starboard | steal | steward | stoke |
| stage-struck | starburst | stealthy | stewardess | stole |
| stagecoach | starchy | steamboat | stick | stolid |
| stagecraft | stardom | steamer | sticker | stoma |
| stagehand | stardust | steamroller | stickleback | stomach |
| stagflation | stare | steamship | stickler | stomachache |
| stagger | starfish | steamy | stickpin | stomp |
| stagnant | stargaze | steatite | stickup | stone |
| stagnate | stargazer | steed | sticky | stone-deaf |
| staid | starkly | steel | stiff-necked | stonecutter |
| stained-glass | starlet | steelworker | stiffen | stonemason |
| stainless | starlight | steely | stiffener | stonewall |
| stair | starling | steelyard | stifle | stoneware |
| staircase | starlit | steenbok | stigma | stonework |
| stairway | starry | steepen | stigmatic | stony |
| stairwell | starry-eyed | steeple | stigmatism | stooge |
| stake | starstruck | steeplechase | stigmatize | stool |
| stakeholder | start | steeplejack | stile | stoop |
| stalactite | starter | steerage | stiletto | stop |
| stalagmite | startle | steersman | still-life | stopcock |
| stale | starve | stegosaur | stillbirth | stopgap |
| stalemate | starveling | stein | stillborn | stoplight |
| stalk | stash | stele | stillness | stopover |
| stalker | stasis | stellar | stilted | stoppage |
| stall | state | stem | stimulant | stopper |
| stallion | statehood | stem-winder | stimulate | stopwatch |
| stalwart | statelet | stemless | stimulus | storage |
| stamen | stately | stemware | sting | store |
| stamina | statement | stench | stingray | store-bought |
| stammer | stateroom | stencil | stingy | storefront |
| stamp | stateside | stenographer | stink | storehouse |
| stampede | statesman | stenotype | stinkpot | storekeeper |
| stance | statewide | stentorian | stinkweed | storeroom |
| stanch | static | step | stint | storewide |
| stanchion | station | step-(family) | stipend | storied |
| stand-out | stationary | step-down | stipple | stork |
| stand | stationery | stepladder | stipulate | stormy |
| stand-in | stationmaster | steppe | stipulation | story |
| stand-off | statistic | stepping-stone | stir | storybook |
| standard | statistical | stepsibling | stirrup | storyteller |
| standard-bearer | statistics | stepwise | stitch | stoup |
| standardize | stator | stereo | stoa | stouthearted |
| standby | statuary | stereophonic | stoat | stovepipe |
| standing | statue | stereoscope | stockade | stovetop |
| standoffish | statuesque | stereotypic | stockbroker | |
| standpipe | statuette | sterile | stockholder | |
| standpoint | stature | sterility | stockinet | |
| standstill | status | sterilize | stocking | |
| standup | status-quo | sterling | stockman | |

| | | | | |
|---|---|---|---|---|
| ad | adenoids | adjust | adopt | advance |
| adage | adenoma | adjustable | adoptee | advantage |
| adagio | adept | adjuster | adoptive | advantageous |
| adam | adeptness | adjustment | adorable | advene |
| adam's-apple | adequacy | adjutant | adore | advent |
| adamant | adequate | adjuvant | adorn | adventitious |
| adamantine | adhere | adlib | adornment | adventure |
| adapt | adherent | adman | adown | adventuresome |
| add | adhesion | administer | adoze | adventurous |
| addend | adhesive | administrative | adread | adverb |
| addendum | adhibit | admirable | ad-rem | adverbial |
| adder | ad-hoc | admiral | adrenaline | adversary |
| addible | ad-hominem | admire | adrift | adversative |
| addict | adiabatic | admissible | adrip | adverse |
| addiction | adieu | admission | adroit | adversity |
| addition | ad-infinitum | admit | adscript | advert |
| addle | ad-interim | admittance | adsorb | advertise |
| addle-brained | adios | admix | adulate | advice |
| address | adipose | admixture | adult | advisable |
| addressee | adit | admonish | adulterate | advise |
| adduce | adjacent | admonition | adulterer | advisee |
| adducent | adject | admonitory | adulterous | advisement |
| adducer | adjectival | adnate | adultery | advisor |
| adduct | adjoin | ad-nauseam | adulthood | advisory |
| adductor | adjourn | adnexa | adumbral | advocacy |
| adeem | adjudge | ado | adumbrate | advocate |
| ademonist | adjudicate | adobe | adunc | adynamic |
| ademption | adjunct | adolescence | adust | adze |
| adenitis | adjure | adonis | ad valorem | |
| | | | | |
| abracadabra | assuade | behead | cabbagehead | clodhead |
| abrade | astraddle | blackhead | cad | cockshead |
| abroad | autocade | bladder | cadaver | colada |
| academe | avocado | blade | caddie | colonnade |
| accolade | bad | blockade | cadence | compadre |
| acidhead | bad-ass | boatload | cadenza | comrade |
| addlehead | bad-blood | bombadier | cadet | contradict |
| adread | bad-mouth | boneheaded | cadgy | coolheaded |
| aficionado | bad-tempered | brad | cadre | copperhead |
| ahead | bade | braggadocio | caduceus | copyreader |
| alackaday! | badge | bravado | camaraderie | cradle |
| all-pervading | badger | bread | cannonade | crossroad |
| already | badger-state | breadbasket | carload | crusade |
| ambassador | badinage | breadth | cartload | dad |
| ambuscade | badlands | breadwinner | cascade | dad-blamed! |
| animadvert | badman | breathless | cat's-cradle | dad-blasted! |
| antegrade | badminton | brigade | cavalcade | dad-burned! |
| antiradical | baldheaded | broad | chador | dadaism |
| antitrade | ballad | broad-jump | chairlady | dead |
| aquacade | bandleader | broadband | charade | dead-center |
| arcade | barehead | broadcast | charlady | dead-end |
| armada | barricade | broaden | cheerleader | dead-eye |
| armadillo | bead | broadminded | chickadee | dead-heat |
| armload | beadle | broadtail | cicada | deadbeat |
| arrowhead | beady | Broadway | circadian | deadbolt |
| asaddle | beady-eyed | brocade | citadel | deaden |
| aspread | bedspread | bulkhead | clad | deadfall |
| asshead | bedstead | bull-headed | clearheaded | deadhead |

| | | | | |
|---|---|---|---|---|
| deadline | glad | ironclad | notepad | saddlebag |
| deadlock | glade | irradiate | nowadays | sadist |
| deadly | gladiator | jade | offload | salade |
| deadpan | gladiolus | jughead | olympiad | saleslady |
| deadweight | glissade | keypad | overhead | saphead |
| decade | goad | knead | overlade | scads |
| decadent | gonad | kneepad | overload | scorepad |
| degrade | grad | knucklehead | overshadow | scratchpad |
| desperado | gradable | lackadaisical | overspread | seadog |
| diadem | grade | lad | pad | serenade |
| dissuade | gradient | ladder | paddle | shad |
| dog paddle | gradual | lade | paddock | shade |
| doodad | graduate | ladle | paddy | shadow |
| dos-à-dos | granddad | lady | padlock | shady |
| doubleheader | grenade | ladybug | padre | shipload |
| downgrade | had | lampshade | parade | shortbrad |
| download | haddock | lead | paradigm | skedaddle |
| dread | hairsbreadth | leadoff | paradise | skinhead |
| dreadlocks | hammerhead | lemonade | paradox | slade |
| dreadnought | handmade | letterhead | paygrade | sleepyhead |
| drumhead | handsbreadth | levelheaded | payload | snakehead |
| dull-head | hardhead | limeade | peccadillo | softhead |
| dumbhead | head | load | persuade | sorehead |
| dunderhead | headband | loadstar | pervade | spade |
| egad! | headbanger | loggerheads | pigheaded | spearhead |
| egghead | headboard | macadam | pinhead | spread |
| embassador | headcount | mad | plead | spreadeagle |
| embroaden | headdress | madam | pomade | spreadsheet |
| empty-headed | headhunt | madame | pompadour | squad |
| enchilada | headline | madcap | pothead | squadron |
| encradle | headmaster | madden | printhead | stadium |
| eradicate | headquarters | made | promenade | stead |
| escapade | headrest | madhouse | proofread | steadfast |
| esplanade | headroom | madonna | puddinhead | steady |
| evade | heads! | madre | quad | stepladder |
| everglades | headseat | make-do | quadrant | stockade |
| extradite | headshrinker | make-over | quadruped | straddle |
| eyeshadow | headstone | make-ready | quadruple | sunshade |
| façade | headstrong | make-up | quesadilla | swaddle |
| fad | headwaiter | maladjusted | radar | sweetbread |
| fade | headwaters | malady | radial | swellheaded |
| fade-away | headway | manmade | radiant | switchblade |
| far-spreading | headwind | marinade | radical | tad |
| farmstead | headword | masquerade | radio | tadpole |
| fathead | heady | matador | radish | thickheaded |
| fiddle-faddle | helipad | mead | radius | thread |
| figurehead | highroad | meadow | railroad | threadbare |
| footpad | hogshead | misadventure | rattlehead | thunderhead |
| forbade | homemade | misadvise | read | tightwad |
| forehead | homestead | mislead | redhead | tirade |
| foreshadow | homestead | misread | reload | toad |
| freeload | hophead | motorcade | renegade | toadstool |
| fusillade | hothead | muddlehead | road | toady |
| gadabout | inkpad | myriad | roadrunner | tornado |
| gadfly | instead | nadir | roadshow | trade |
| gadget | instead | nightshade | rollerblades | trademark |
| gadzooks! | instead-of | nomad | sad | tradeoff |
| gingerbread | invade | nonadult | saddle | tradesman |

FIG. 8B

AG again, against, age, ago, -age

| | | | | |
|---|---|---|---|---|
| again | agger | agility | agnize | agravic |
| against | aggie | aginner | agnomen | agree |
| agamete | agglomerate | agio | agnostic | agreeability |
| agape | agglutinate | agiotage | agnosticism | agreeable |
| agar | aggrade | agist | ago | agreeableness |
| agasp | aggrandize | agitate | agog | agreeably |
| agate | aggravate | agitation | agon | agreement |
| agave | aggravation | agitato | agonal | agrestal |
| agaze | aggregate | aglare | agone (past) | agrestic |
| age-old | aggregation | agleam | agonic | agricultural |
| age | aggress | aglee | agonize | agriculture |
| aged | aggress | agley | agony | agriculturist |
| ageless | aggression | aglimmer | agora | agrology |
| agelong | aggressive | aglitter | agoraphobia | agronomic |
| agency | aggressor | aglomerate | agouti | agronomist |
| agenda | aggrieve | aglow | agraffe | agronomy |
| agenesis | aggrieve | agminate | agrapha | aground |
| agent | aghast | agnail | agraphia | ague |
| agentry | agile | agnate | agrarian | |

| | | | | |
|---|---|---|---|---|
| abusage | black-magic | dagger | exaggerate | heritage |
| acreage | blockage | damage | extravagant | hiragana |
| adage | brag | defoliage | extravaganza | hoagy |
| adagio | braggart | demagogue | fag | homage |
| advantage | breakage | diagnosis | faggot | hostage |
| afterimage | brokerage | diagonal | farrago | image |
| anagram | brummagen | diagram | finagle | imagine |
| antagonize | bush-league | diaphragm | flag | intaglio |
| appendage | butt-against | discourage | flag-waver | invaginate |
| archipelago | cabbage | disengage | flagellate | jag |
| arrearage | cabbagehead | dishrag | flagon | jagged |
| asparagus | cage | disparage | flagpole | jaguar |
| assemblage | cagey | dosage | flagrant | lag |
| assuage | camouflage | dotage | flagship | lag-behind |
| autophagy | carnage | dowager | flagstone | laggard |
| average | carpetbag | downstage | fleabag | lagniappe |
| backstage | carriage | drag | foliage | lagoon |
| badinage | chagrin | drag-down | footage | language |
| bag | champagne | dragnet | forage | lasagna |
| bagatelle | cleavage | dragon | fragile | lavage |
| bagel | coagulate | dragonfly | fragment | league |
| baggage | coinage | drainage | fragrant | leakage |
| baggy | cold-storage | eager | front-page | leverage |
| bagpipe | collage | eagle | frottage | lineage |
| bandage | collagen | eagle-eyed | fuselage | linkage |
| bandwagon | concubinage | eagle-scout | gag | little-league |
| barrage | conflagration | encourage | gaga | luggage |
| batting-cage | contagion | engage | gage | lumbago |
| bavardage | corsage | engage-in | gaggle | magazine |
| beagle | cottage | cnola-gay | gagster | magenta |
| beanbag | counteragent | enrage | garage | maggot |
| bedraggle | courage | entourage | garbage | magic |
| beleaguer | coverage | envisage | hag | magistrate |
| beverage | craggy | esophagus | haggard | magma |
| big-league | cro-magnon | etagere | haggle | magna-cum- |
| birdcage | curettage | evaginate | handbag | laude |

| | | | | |
|---|---|---|---|---|
| magnanimous | over-again | rag | shortage | tragedy |
| magnate | over-against | ragamuffin | shrinkage | triage |
| magnet | package | rage | slag | turn-against |
| magnificent | pagan | ragout | slippage | tutelage |
| magnify | page | ragpicker | snag | umbrage |
| magnitude | pageant | ragtag | snaggle | undamaged |
| magnolia | pageboy | ragtime | soilage | underage |
| magot | pager | rampage | spaghetti | unimaginable |
| magpie | paginate | ravage | spillage | upstage |
| mailbag | pagoda | reagent | spoilage | usage |
| manage | paragon | rise-against | spread-eagle | vagabond |
| marriage | paragraph | rivage | stag | vagal |
| massage | parentage | roughage | stage | vagina |
| meager | parsonage | rummage | stage-fright | vagrant |
| menage | passage | rutabaga | stagecoach | vague |
| menagerie | patronage | sabotage | stagehand | vantage |
| message | pedagogue | sag | stagger | vassalage |
| mileage | Pentagon | saga | stagnate | verbiage |
| minor-league | pentagram | sage | stalag | vicarage |
| mirage | peonage | sagebrush | stalagmite | village |
| miscarriage | percentage | sagittarius | steerage | vintage |
| mismanage | persiflage | salvage | storage | virago |
| mixed-bag | personage | sandbag | stowage | visage |
| moneybags | pillage | sarcophagus | straggle | voltage |
| montage | plagiarize | sausage | stratagem | voyage |
| mortgage | plague | savage | suffrage | wag |
| mucilage | plumage | schoolbag | surplusage | wage |
| nag | postage | scourage | swag | wager |
| necrophagy | pottage | scraggy | swagger | wagon |
| nonage | pragmatic | scrimmage | synagogue | washrag |
| now-and-again | presage | seagoing | tag | windbag |
| offstage | price-tag | seepage | tagalong | wraggle |
| old-age | propaganda | seraglio | tanager | wreckage |
| onager | propagate | sewage | tarragon | yardage |
| orphanage | protagonist | shag | teenager | zigzag |
| outage | punching-bag | shillelagh | tonnage | |
| outrageous | quagmire | | | |

| | | | | |
|---|---|---|---|---|
| aid | ainu | airdry | airless | airspeed |
| aida | air | airedale | airlift | airstream |
| aide | airbase | airfare | airline | airstrike |
| aide-de-camp | airborne | airfield | airmail | airstrip |
| aids | airbrained | airflow | airman | airtight |
| aigrette | airbrakes | airfoil | airmile | airtime |
| ail | airbrush | airforce | airplane | airwave |
| aileron | airbus | airframe | airport | airway |
| ailment | aircondition | airfreight | airpost | airworthy |
| ailurophile | aircraft | airglow | airraid | airy |
| ailurophobe | aircrew | airgun | airship | aisle |
| aim | airdrome | airhead | airsick | aitch |
| aimless | airdrop | airhunger | airspace | |
| ain't | | | | |

| | | | | |
|---|---|---|---|---|
| abstain | bird-brain | cottontail | eyestrain | hair's-breadth |
| acclaim | blackmail | counterclaim | fail | hair-splitting |
| acquaint | bloodstained | countervail | fain | hair-stylist |
| addlebrain | boatswain | cremains | faint | hair-trigger |
| affair | bobtail | crossgrain | fainthearted | hairbrain |
| aforesaid | braid | curtail | fair | hairbrush |
| afraid | braille | curtain | fair-and-square | haircut |
| afterpain | braindrain | dadaist | fair-haired | hairdo |
| again | brainless | daily | fair-minded | hairpiece |
| against | brainpower | dainty | fairgrounds | hairpin |
| algebraic | brainstorm | daiquiri | fairy | handmaid |
| antiaircraft | brainteaser | dairy | fairy-tale | handrail |
| appertain | brainwash | dairymaid | faith | hangnail |
| appraise | brainwave | dais | falaise | headwaiter |
| archaic | brainy | daisy | fantail | highchair |
| armchair | braise | daisywheel | featherbrain | hightail |
| arraign | bridesmaid | debonair | fingernail | hobnail |
| ascertain | butt-against | declaim | fishtail | horsehair |
| assail | cain | derail | flail | hot-air |
| attain | campaign | despair | flair | housemaid |
| attainder | captain | detail | fountain | jai-alai |
| au-lait | certain | detain | foxtail | jail |
| au-pair | chain | detrain | fraidy-cat | jailbait |
| avail | chair | disclaim | frail | jailbird |
| await | chairmaker | disdain | fraise | jailbreak |
| baaing | chairperson | disrepair | frigidaire | jailhouse |
| bail | chambermaid | distain | funfair | judaiser |
| bail out | champaign | doctrinaire | gaiety | kitchenmaid |
| bailiff | chaplain | domain | gain | lackadaisical |
| bailiwick | chieftain | doornail | gainsay | laic |
| bain | claim | dovetail | gait | laicize |
| bairn | clairvoyance | downstairs | gaiter | laid |
| bait | coattails | drain | goldenrain | lain |
| balalaika | cocaine | draining | good-faith | lair |
| ball-&-chain | cochairperson | ducktail | grail | laity |
| banzai! | cocktail | dumbwaiter | grain | lamebrain |
| bargain | coffin-nail | eclair | grease-paint | liaison |
| barmaid | complain | engrain | grow-faint | longhair |
| bearnaise | complaisant | entail | guardrail | maid |
| beaujolais | constrain | entertain | hail | maidenhair |
| bedrail | contain | entrails | hail-from | maigre |
| bewail | containment | exclaim | hailstone | mail |
| billionaire | contrail | explain | hair | mailbag |

| | | | | |
|---|---|---|---|---|
| mailman | ordain | ptomain | samurai | traitorous |
| maim | outbargain | quai | scatterbrain | travail |
| main | overpaid | quail | schoolmaid | unacquainted |
| mainframe | paid | quaint | shirttail | unaided |
| mainland | pail | quitclaim | slain | unassailable |
| mainline | pain | raid | snail | unattainable |
| mainspring | painkiller | rail | solitaire | uncertain |
| mainstay | painless | railroad | sprain | unchain |
| mainstream | painstaking | raiment | stair | unclaimed |
| maintain | paint | rain | stairwell | unfairly |
| maize | paintbox | rainbow | straight | unfaithful |
| medicaid | paintbrush | raincheck | straightjacket | ungainly |
| mermaid | pair | raincoat | strain | unobtainable |
| mermaid | paisley | rainmaker | sustain | unpainful |
| migraine | parfait | raintight | swail | unsaid |
| milkmaid | pertain | raise | swallowtail | upsidaisy! |
| millionaire | pigtail | raisin | swordtail | upstairs |
| minibrain | plaid | rattlebrain | tail | vain |
| minibrain | plain | reconnaissance | tailbone | villain |
| mohair | plainsman | refrain | tailgate | waif |
| monorail | plaint | regain | tailor | wail |
| mosaic | plait | remain | tailspin | waist |
| mountain | plantain | renaissance | taint | wait |
| muddlebrained | ponytail | repair | taipan | waitress |
| naif | porcelain | restrain | terrain | waive |
| nail | portrait | retail | toenail | waylaid |
| nailfile | prairie | retain | trail | wheelchair |
| naive | praise | retrain | train | wraith |
| novocaine | prevail | sail | traipse | yellowtail |
| nursemaid | proclaim | sailor | trait | |
| obtain | prosaic | saint | | |

FIG. 8F

| 1 一 | | | 2 丨 | | | 3 丶 | | | 4 丿 | | | 5 乙 | | |
|---|---|---|---|---|---|---|---|---|---|---|---|---|---|---|
| 一 | | | 三 | 丶 | 亅 | 弗 | 丶 | 丷 | 丷 | 丿 | 乀 | 八 | 之 | 乞 |
| 6 丁 | | | 7 二 | | | 8 亠 | | | 9 人 | | | 10 儿 | | |
| 亅 | 乚 | ✓ | 二 | 云 | 亘 | 京 | 享 | | 入 | 从 | | 乚 | 兀 | 尤 |
| 11 入 | | | 12 八 | | | 13 冂 | | | 14 冖 | | | 15 冫 | | |
| | 从 | | 仝 | 今 | 令 | 閑 | 閑 | 囿 | 冖 | 冖 | 艹 | | | |
| 16 几 | | | 17 凵 | | | 18 刀 | | | 19 力 | | | 20 勹 | | |
| 凡 | 凡 | 凡 | 凶 | 区 | 冈 | 刃 | 刄 | 丸 | | | 加加 | 曷 | 书 | 爲为 |
| 21 匕 | | | 22 匚 | | | 23 匸 | | | 24 十 | | | 25 卜 | | |
| 包 | 眞 | | 匚 | 匸 | 匚 | 匸 | 荒 | 荒 | 七 | 士 | 艹 | 下 | 上 | 赤 |
| 26 卩 | | | 27 厂 | | | 28 厶 | | | 29 又 | | | 30 口 | | |
| 卩 | 也 | | 厂 | 后 | 底 | | 厶 | 厺 | 又 | 双 | 叒 | | 吅 | 品 |
| 31 囗 | | | 32 土 | | | 33 士 | | | 34 夂 | | | 35 夊 | | |
| | 回 | 亶 | 圡 | 圭 | 垚 | 壬 | 千 | 壽 | 夂 | 夋 | | | | |

FIG. 9A

| ³⁶ 夕 | | | ³⁷ 大 | | | ³⁸ 女 | | | ³⁹ 子 | | | ⁴⁰ 凵 | | |
|---|---|---|---|---|---|---|---|---|---|---|---|---|---|---|
| | 多 | | 夬 | 央 | 央 | 妻 | 妻 | | 孓 | 氶 | 函 | 屮 | 屮 | 囊 |
| ⁴¹ 寸 | | | ⁴² 小 | | | ⁴³ 尢 | | | ⁴⁴ 尸 | | | ⁴⁵ 屮 | | |
| 才 | 于 | | 小 | | | 尢 | 尢 | | 尺 | 尼 | 屬 | 出 | 芻 | 蚩 |
| ⁴⁶ 山 | | | ⁴⁷ 巛 | | | ⁴⁸ 工 | | | ⁴⁹ 己 | | | ⁵⁰ 巾 | | |
| 畄 | 出 | 屈 | 巠 | 兪 | 俞 | 丁 | 工 | | 巳 | 巴 | | 帀 | 市 | |
| ⁵¹ 干 | | | ⁵² 幺 | | | ⁵³ 广 | | | ⁵⁴ 廴 | | | ⁵⁵ 廾 | | |
| 午 | 开 | 平 | 彡 | 丝 | 絲 | 户 | | | 乃 | 及 | 弓 | 开 | 井 | 无 |
| ⁵⁶ 弋 | | | ⁵⁷ 弓 | | | ⁵⁸ 彐 | | | ⁵⁹ 彡 | | | ⁶⁰ 彳 | | |
| 七 | 戈 | 武 | 肀 | 弗 | 妻 | 聿 | ヨヨ | 者 | | | | | 從 | |
| ⁶¹ 心 | | | ⁶² 戈 | | | ⁶³ 户 | | | ⁶⁴ 扌 | | | ⁶⁵ 支 | | |
| 必 | | | 咸 | 戔 | 戔 | 户 | 戶 | | 手 | | | | 坴 | |
| ⁶⁶ 攵 | | | ⁶⁷ 文 | | | ⁶⁸ 斗 | | | ⁶⁹ 斤 | | | ⁷⁰ 方 | | |
| | | | 又 | 丈 | 亥 | 头 | | | 丘 | 所 | 兵 | 刁 | 力 | 万 |

FIG. 9B

| 71 无旡 | 72 日 | 73 曰 | 74 月 | 75 木 |
|---|---|---|---|---|
| 旡 | 由 申 甲 | 曲 曲 典 | | 末 未 本 |
| 76 欠 | 77 止 | 78 歹 | 79 殳 | 80 母 毋 |
| | 正 武 焉 | 夕 ㄠ 乏 | | 毋 每 |
| 81 比 | 82 毛 | 83 氏 | 84 气 | 85 水 |
| 北 | 毛 毛 毳 | 匚 厶 弓 | | 永 永 |
| 86 火 | 87 灬 | 88 八 | 89 乂 | 90 爿 丬 |
| 燚 炎 勞 | 金 叕 | 父 | 眞 乂 爻 六 | 丩 卯 止 |
| 91 片 | 92 牙 | 93 牛 | 94 犭 | 95 玄 |
| | | | 犬 太 | 玄 率 |
| 96 王 | 97 瓜 | 98 瓦 | 99 甘 | 100 生 |
| 玉 珏 主 | 川 爪 州 | 丙 丐 氐 | 廿 世 卅 | 主 丰 |
| 101 用 | 102 田 | 103 疋 | 104 疒 | 105 癶 |
| 舟 | | 畾 晶 疋 疋 | | 久 夂 夊 |

| 141 庀 | 142 虫 | 143 血 | 144 衘行 | 145 衣 |
|---|---|---|---|---|
| 疟 盧 | 中 串 虫 | | 行 | 以 哀 衣 |
| 146 西 | 147 見 见 | 148 角 | 149 言 讠 | 150 谷 |
| | | 用 周 | | 合 僉 僉 |
| 151 豆 | 152 豕 | 153 豸 | 154 貝 贝 | 155 赤 |
| 豆 | 豐 豊 | 勿 豖 易 | 勿 勿 | 且 顆 且 亦 兼 兼 |
| 156 走 | 157 足 | 158 身 | 159 車 車 车 | 160 辛 |
| 隶 走 | 足 是 | 史 曳 | 甫 卓 叀 | 羊 辯 半 |
| 161 辰 | 162 辶 | 163 阝 | 164 西 | 165 釆 |
| 以 氐 以 | | 尸 巴 邑 | 西 酉 | 乎 于 |
| 166 里 | 167 金 钅 | 168 長 长 | 169 門 门 | 170 阝 |
| 黑 | 全 余 | 乍 镸 镸 | 鬥 | 艮 艮 呂 |
| 171 隶 | 172 隹 | 173 雨 | 174 青 | 175 非 |
| 聿 肀 甫 肃 | 崔 宀 隹 | 兩 芇 靈 | | 丰 拌 |

| 211 齒齒齿 | 212 龍竜龙 | 213 龜亀龟 | 214 侖仑 | 215 丷 |
|---|---|---|---|---|
| 肉肉 | 发发龙 | 那叵尋 | 冊 | 兰 六 |
| 216 マ | 217 亠 | 218 丂 | 219 大 | 220 刂 |
| | | 西亏 | 于 | 小 |
| 221 九 | 222 亻 | 223 丷 | 224 衣 | 225 光 |
| 九九 | 们 | 丷 兰 兴 | 衣 | 业 |
| 226 屮 | 227 灬 | 228 丑丑 | 229 夫 | 230 先 |
| | | 丙 灬 向 门 冊 | 失 夫夫 夫 | 兟 競 |
| 231 牛 | 232 业 | 233 | 234 肖 | 235 其 |
| 我 | 乂 | 亚 並 並 | 尚 当 | 甚 |
| 236 果 | 237 無 | 238 兴 | 239 关 | 240 共 |
| 東東 東东 | 世 無 | 幽 幽 | 夹 关 美 | 共 共 廾 |
| 241 | 242 | 243 | 244 羊羊羊 | 245 刀 |
| | | | 养 姜 兰 | 月 丹 |

FIG. 9G

METHOD FOR LEARNING CHINESE CHARACTER SCRIPT AND CHINESE CHARACTER-BASED SCRIPTS OF OTHER LANGUAGES

CROSS-REFERENCE TO RELATED APPLICATION

This application claims the benefit under 35 U.S.C. § 119(e) of U.S. Provisional Application No. 60/687,566, filed Jun. 3, 2005, the complete disclosure of which is hereby incorporated by reference herein in its entirety.

STATEMENT REGARDING FEDERALLY SPONSORED RESEARCH OR DEVELOPMENT n/a

BACKGROUND OF THE INVENTION

1. Field of the Invention

The present invention relates to a method for learning Chinese character script and Chinese-based Character script for other languages, for example, written Japanese, Classical Korean, and Classical Vietnamese.

2. Summary of the Invention

The present invention provides a method for learning the scripts of Chinese character-based languages, for example, Japanese and Korean, which overcomes disadvantages of previously known methods and provides an easier way to learn written languages having many characters, such as the thousands of written Chinese characters, some of which being relatively complex.

A Key-Symbol System described herein is a mnemonic, step-wise process for learning the character-based scripts of numerous languages. For example, the Key-Symbol System can be used to learn the written Chinese language. These scripts include those of Mandarin and other Chinese languages such as Fu, Cantonese, Amoy Hokkien, Taiwanese, among many others—both in the classic and simplified forms. These languages/dialects have many alternate forms, abbreviations, dialectic characters, and redundant or archaic characters that are learned easily through the Key-Symbol System. Lexicographers, multi-linguists, philologists, and students can appreciate the learning techniques of the Key-Symbol System.

The Key-Symbol System also can be used to cover the character scripts of Japanese and Korean, even though these two languages have a secondary phonetic syllabary or alphabet, respectively.

The Key-Symbol System could also be used by other Asian languages and cultures that use similar or identical characters for official, decorative, or other purposes. Some of these cultures include those of Thailand, Viet Nam, Singapore, and expatriate communities worldwide.

Names for characters in some of the exemplary languages that can apply the Key-Symbol System are Han-dz (Chinese), Kanji (Japanese), Hanja (Korean), and Chu Nom (Vietnamese).

To prevent redundancy in the description herein, Chinese will be used as the exemplary language for applying the Key-Symbol system to character-based writing systems.

For the purpose of explaining the Key-Symbol System, the following vocabulary will apply:

Character: The equivalent of a written word in English. A Character is a complete written Chinese word.

The Character 迷, pronounced mee in the second tone, means "to be lost" and is a complete written Chinese word.

Symbol: A part of a Character, roughly equivalent to a single letter in English. Just as the letters "d" and "o" make up the word "do," the symbols 辶 and 米 together, form the character 迷 pronounced "mee" and having the meaning "to be lost." Symbols combine to form complete Chinese words just as letters combine to form English words. For purposes of the present invention, the term Symbol includes what standard grammar texts refer to as radicals ["roots"] and non-radical elements. Radicals follow a standard numbering configuration in all textbooks and are used to classify all Characters.

The Key-Symbol System uses a memory association technique for making complex Characters easier to remember by taking advantage of the fact that such Characters are composed of combinations of other, more basic and easily recognizable Characters already known by a user, herein referred to as a student.

Simply put, the student begins learning some basic Chinese Characters. For example, the Symbol for the word "step" is 辶 and the Symbol for the word "rice" is 米.

After a subset of basic Symbols and Characters is known, the student begins recognizing combinations of these basic Symbols and Characters in more complex Characters, the latter of which having a different meaning than the basic Symbols or Characters when such Symbols or Characters are read separately. Because there are thousands of Characters in the Chinese written language, it would be beneficial to provide the student with a memory tool or system that allows him/her to jog his/her memory for obtaining the meaning of the complex Character. The Key-Symbol System provides such benefits by applying a process of breaking down the complex Character and associating English words to each portion of the Character that, when remembered by the student, allows the student to reconstitute the complex Character from the combination of simpler Characters.

In particular, the Key-Symbol System separates complex Characters into their constituent parts (Symbols and/or Characters) referred to herein as Symbols. These Symbols have particular meanings, already known to the student, because they are in a subset of his/her learned Characters. A Key is formed from the Symbol to be the English definition of the Symbol. For example, if the Symbol 辶 has the meaning "step", then the Key for that basic Character is the English word "step." The Key-Symbol System of the present invention is not limited to English. This System can be applied to any Latin alphabet-based language such as Spanish, Portuguese, French, Italian, or German, or to transliterations of non-Latin alphabets such as Russian, Greek, Hebrew, Aramaic, Arabic, etc.

A particular example parses the complex Character 迷 having the meaning "to get lost." This two-part complex character includes two Symbols, the first Symbol 辶 is for the word "step" and the second Symbol 米 is for the word "rice." Thus, the Keys for the symbol for the verb "to get lost" are the English words "step" and "rice."

Next, each Key is broken down by defining its first two letters as a Bridge. Here, "r" and "i" and "s" and "t", respectfully, form the Bridges "RI" and "ST."

To facilitate the visual impression, the Bridge is typed or hand printed in bold, underlined upper-case letters (which can also be red in color if the student desires). The remainder of the Bridge is typed or handwritten in unbolded, black non-underlined lower-case letters. For example RIce, STep. Therefore, to remember the complex Character 迷 for the verb "to get lost," the student knows that he/she needs to remember a catch-phrase, or mnemonic, having the two Bridges "ST" and "RI." In the English language, there are many words containing the Bridges "ST" and "RI." Some words begin with one of these Bridges, and some words contain one of these bridges in the interior. For example, the words "riot" and "crisis" each contain the Bridge "RI" and the words "storm" and "arrest" each contain the Bridge "ST." To apply the Key-Symbol System, the student defines the mnemonic Memory Jogger "STorm RIot" or the mnemonic Memory Jogging Sentence "Swept up in the STorm of a RIot" for the complex Character 迷 having the meaning "to get lost." It is noted that the only upper-case letters in a Memory Jogger Sentences are those which form parts of Bridges. All other letters are lower-case even if they are the first letter of a proper noun, the first letter of a sentence, or are customarily upper-case such as "I" or "USA".

Now that the student has the mnemonic associated with the Character for "to get lost," all that the student needs to do to write the complex Character is to recall and deconstruct the mnemonic. The student, then, determines the Bridges "ST" and "RI" from the mnemonic. The student knows that the bridge "ST" always carries the Key "step" and that the bridge "RI" always carries the Key "rice." Because the student already knows the simple Chinese Characters 辶 and 米 for the words "step" and "rice," respectively, the student merely writes down these two Characters next to one another and, therefore, has written the complex Character 迷 having, as its meaning, "to get lost."

The Key-Symbol System can be applied to any complex Chinese Character and further examples can be appreciated without describing them herein.

With variations in single Characters, the Key-Symbol System can be expanded to address these and other concerns using a Source-Icon System. The Source Icon System allows the differentiation of three variations of a single character 未, such as 禾 末 木. Each of the three variations has the same strokes, but one additional horizontal stroke intersects at different points on the first Character.

The Key-Symbol System selects an English word (the Key) and its Bridge (the abbreviation of the Key) and joins them to a given Character to form a trio. In the Source-Icon System, the Symbol of the Trio is considered as a "Source" for other symbols that resemble it or that, in some way, form a pattern with the Symbol. These other symbols are referred to as "Icons" of the Source. The Source-Icon System modifies the Bridge by taking advantage of the upper- and lower-case forms of each of the two letters within the Bridge. Binary logic of upper and lower case letters provides four possible configurations for a two-letter Bridge. Using the Bridge "ST", for example, provides the following four possibilities: "ST", "St", "st", and "sT". The Source-Icon takes advantage of this definite set to associate the single Source from the three possible Icons associated with that Source.

Other features that are considered as characteristic for the invention are set forth in the appended claims.

Although the invention is illustrated and described herein as embodied in a method for learning character-based languages, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWINGS

FIGS. 4A and 4B is a list of words representing an exemplary dictionary according to the invention for the word "beget";

FIGS. 5A and 5B is a list of words representing an exemplary dictionary according to the invention for the word "cardiac";

FIGS. 6A and 6B is a list of words representing an exemplary dictionary according to the invention for the word "rice";

FIG. 7 is a list of words representing an exemplary dictionary according to the invention for the word "step";

FIG. 8A to 8F is a list of words representing exemplary dictionary according to the invention for various words; and FIG. 9A to 9G is a chart of matrices grouping a single Source with its one, two, or three respective Icons.

DETAILED DESCRIPTION OF THE PREFERRED EMBODIMENTS

Figure 1:
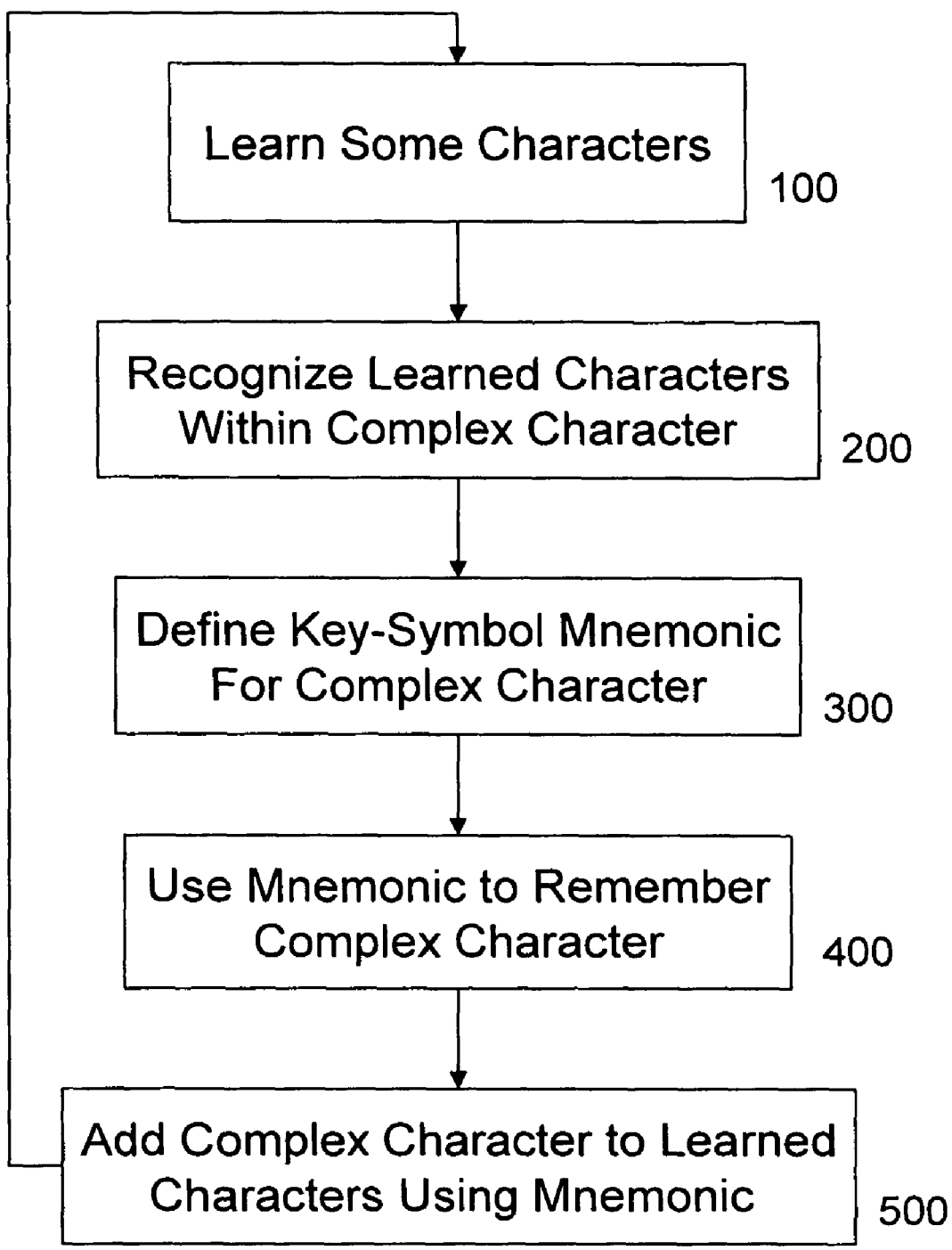
FIG. 1 is a flowchart of the method according to the invention.
Figure 2:
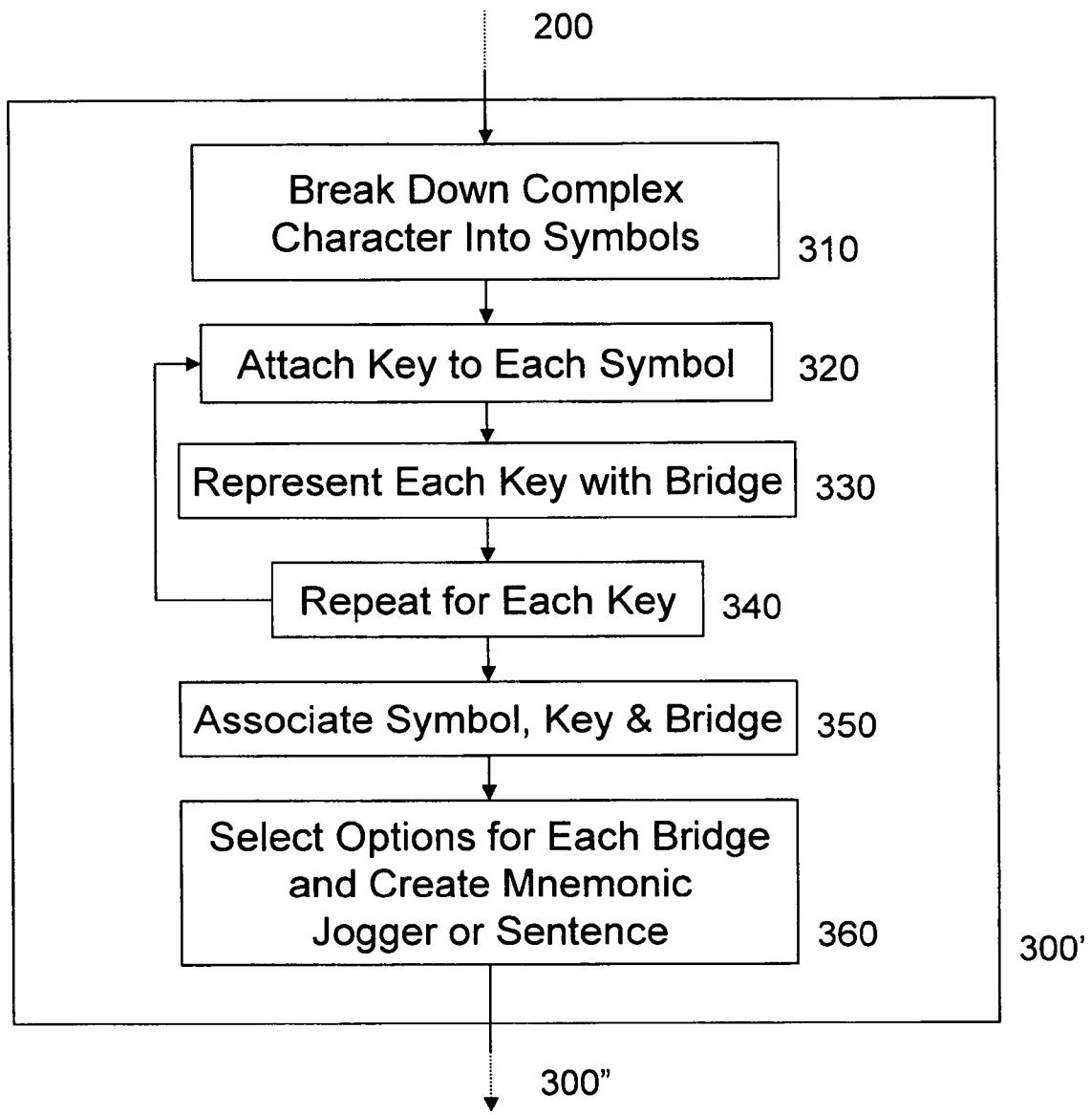
FIG. 2 is a flowchart expanding a portion of the flowchart of FIG. 1.

While the specification concludes with claims defining the features of the invention that are regarded as novel, it is believed that the invention will be better understood from a consideration of the following description in conjunction with the drawing figures, in which like reference numerals are carried forward.

Before the present invention is disclosed and described, it is to be understood that the terminology used herein is for the purpose of describing particular embodiments only and is not intended to be limiting. It must be noted that, as used in the specification and the appended claims, the singular forms "a," "an," and "the" include plural references unless the context clearly dictates otherwise.

Referring now to the figures of the drawings in detail and first, particularly to FIG. 1 thereof, there is shown a flowchart for applying the Key-Symbol System. The Key-Symbol System uses a memory association technique for making complex Characters easier to remember because they are composed of combinations of other, more basic Characters already known by the student.

In Step 100, the student begins learning some basic Characters.

After a subset of basic Characters are learned, in Step 200, the student begins seeing combinations of these basic Characters in more complex Characters, the latter of which having a different meaning than the basic Characters when read separately.

To remember how to write the complex Character, the student, in Step 300, applies the Key-Symbol System to break down the complex Character and associate an English mnemonic to the complex Character that, when remembered by the student, allows the student to reconstitute the complex Character from a combination of simpler known Characters.

Later, when the student sees the complex Character, or wishes to write that complex Character, the student, in Step 400, applies the mnemonic to recreate the desired written Character.

The more that the student applies the mnemonic, the greater the probability that the student adds, in Step 500, that complex Character to the known Characters in the student's vocabulary. As more characters are memorized after using the Key-Symbol System but without having to use the mnemonic, the student learns the written language automatically.

The recognition of simple Characters in a complex Character in Step 200 begins the process for using the Key-Symbol System.

After recognizing the simple characters, the student, in Step 300, applies the Key-Symbol System to break down the complex Character. In particular, in Step 310, the complex Character is separated into its constituent parts, referred to herein as Symbols. These Symbols have particular meanings, already known to the student, because they are in the subset of the student's known basic Characters.

For understanding, the Key-Symbol System is applied in the following text to one exemplary complex Chinese Character 迷 meaning "to get lost." It is noted that the Key-Symbol System can be applied to any Chinese character-based language and use of the Chinese language as set forth below is only done as an example. This exemplary Character is composed of two basic Characters: 辶 for "step" and 米 for "rice." Each of these Characters is defined as a Symbol in the Key-Symbol System.

In Step 320, a Key is attached to each Symbol. The Key is the definition of the Symbol. For example, if the Symbol 辶 has the meaning "step", then the Key for that basic Character is the English word "step." Thus, the Keys for the complex Character 迷 for the verb "to get lost" are the English words "step" and "rice."

In Step 330, one or more unique letters in the Key is (are) used to represent the whole Key. The letter/s used to represent a Key is/are called a Bridge. For clarity, the letters in the Bridge are shown herein in capital form.

| SYMBOL | KEY | BRIDGE |
| --- | --- | --- |
| 辶 | ST ep | "ST" |
| 米 | RI ce | "RI" |

"Step" and "rice" are, therefore, the Keys and the letter combinations "ST" and "RI" are the Bridges. This process is repeated (Step 340) until all Bridges are defined for the Symbols in the Character.

In Step 350, each Key and its associated Bridge is connected to the Symbol in a close-knit group so that the three components—the Key, the Bridge, and the Symbol—are thought of as variations of each other. In other words, recalling one of the Key, the Bridge, or the Symbol immediately brings to mind the other two as set forth in the following diagram.

| SYMBOL | | KEY | | BRIDGE |
| --- | --- | --- | --- | --- |
| 辶 | ↔ | ST ep | ↔ | ST |
| 米 | ↔ | RI ce | ↔ | RI |

The two-headed arrows indicate that the student can easily swing back and forth—left-to-right or right-to-left—to convert any component into the other as desired.

It is important, now, to understand that all of the English vocabulary words have the possibility of containing a Bridge.

The following text illustrates merely several possibilities out of a myriad of thousands of words:

STorm, STeer, STampede include the Bridge ST.

RIckshaw, RIdiculous, RIot include the Bridge RI.

In fact, for the Key-Symbol System, the student can use the vocabulary of jargon, slang, profanity, the argot of various professions, personal names, the names of commercial products and foreign words—even foreign words in a non-Latin alphabet if transliteration to the English alphabet is available, as is usually the case.

Understanding the foregoing, therefore, makes it possible, in Step 360, for the student to select mnemonic options, RIckshaw, for example, or any other word whose Bridge is RI, and to use that selected RI-word to lead back to the Key "Rice" which, in turn, leads back to the Symbol 米, which means that 米 is one of the Symbols in the Character for the verb "to get lost."

In the English language, there are many words containing the Bridges "RI" and "ST." Some words begin with one of these Bridges, and some words contain one of these bridges. For example, the words "riot" and "crisis" each contain the Bridge "RI" and the words "storm" and "arrest" each contain the Bridge "ST." To apply the Key-Symbol System, the student defines the mnemonic from any combination of two words, each containing one of the Bridges. FIGS. 4 through 8 are example dictionary pages for a subset of possible bridges. FIG. 4 shows many possible uses for the Bridge "BE" that always is associated with the symbol 生 having the meaning "beget." FIG. 5 shows many possible uses for the Bridge "CA" that always is associated with the symbol 心 having the meaning "cardiac." FIG. 6 shows many possible uses for the Bridge "RI" that always is associated with the symbol 米 having the meaning "rice." FIG. 7 shows many possible uses for the Bridge "ST" that always is associated with the symbol 辶 having the meaning "step."

Therefore, to remember the complex Character 迷 for the verb "to get lost," the student knows that he/she needs to remember a catch-phrase, or mnemonic, having the two Bridges "ST" and "RI." Selecting one word from each of the above ST and RI examples to form the mnemonics: "STeering RIdiculously," "RIckshaw in a STorm," or "I got lost in a STampede and a RIot."

Now that the student has the mnemonic "STeering RIdiculously" associated with the Character for "to get lost," all that the student needs to do to recall the complex Character is to deconstruct the mnemonic. The student, then, determines the Bridges "RI" and "ST" from the mnemonic. The student knows that the bridge "RI" always carries the Key "rice" and that the bridge "ST" always carries the Key "step." Because the student already knows the simple Chinese Characters 辶 and 米 for the words "step" and "rice," respectively, the student merely writes down these two Characters next to one another and, therefore, has written the complex Character 迷 having, as its meaning, "to get lost."

In summary, when learning a new complex Character, the Character, first, must be broken down into its Symbols (Step 310). Then, each Symbol is converted to a respective Key (Step 320). Then, each Key is converted into a Bridge (Steps 330, 340) and associations are formed (Step 350). The Bridges are used as the criterion for selecting memory jogging words from the general vocabulary of the student that have some relevance to the Character under consideration (Step 360). Once the student selects a word from his/her general vocabulary, this word, then, becomes part of a mnemonic or Memory Jogger Sentence for the Character the student is learning. In the above example, one student may pair up the Memory Joggers STorm and RIckshaw. Another student may pair up STeer and RIdiculous. A third student may pair up STampede and Riot as the Memory Jogger. These Memory Joggers are selected for their relevance to the meaning of the Character 迷 meaning "to get lost." They are, then, put together into a Memory Jogging Sentence along with the meaning of the Character so that a logical sentence emerges:

to get lost in a STampede or RIot.

to get lost, like a RIckshaw in a STorm.

i got lost from STeering RIdiculously!

The Memory Joggers may occur anywhere in the sentence and in any order. All that matters is that the student selects a Memory Jogger that is best remembered by that particular student.

Once the Memory Jogger is learned, the student is able to use it to write the represented character by mentally reciting the Memory Jogger.

"to get lost in a STampede or RIot."

Figure 3:
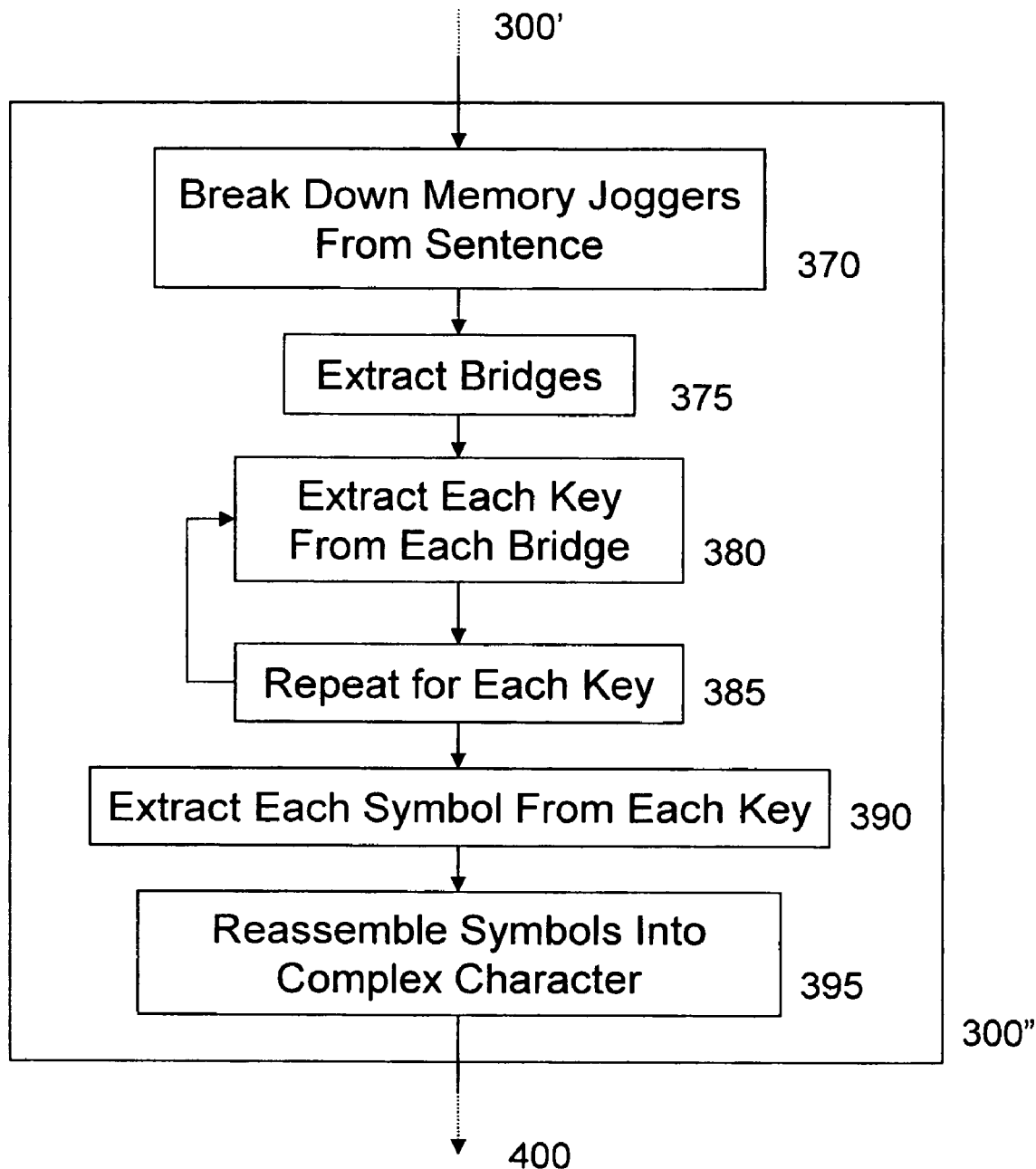
FIG. 3 is a flowchart expanding a portion of the flowchart of FIG. 1 subsequent to the portion of FIG. 2.

Deconstruction of the Memory Jogger or Memory Jogging Sentence is accomplished in the reverse order and this process is assisted with regard to FIG. 3.

In Step 370, the Memory Joggers are mentally isolated from the rest of the sentence, e.g., "STampede" and "RIot."

The Bridges are extracted from the Memory Joggers in Step 375, e.g., to produce "ST" and "RI."

The Bridges are used to lead to their respective Keys in Step 380 and 385. In particular, ST leads to the Key "STep" and RI leads to the Key "RIce."

These two Keys, in Step 390, lead to their respective Symbols, e.g., 辶 for "step" and 米 for "rice."

Finally, in Step 395, the Symbols are reassembled into the complex Character as shown in the following example:

| 辶 | + | 米 | = | 迷 |
|---|---|---|---|---|

Even though the Key-Symbol System is applied in the above example with the complex Chinese Character meaning "to be lost," this example is only one of a multitude of possibilities and is only one possibility for the character-based Chinese language.

The Key-Symbol System works easily with complex Characters such as those examples set forth above. Chinese character-based languages, however, do not have only these easy-to-form complex Characters, but also variations in those complex Characters and variations in the simple Characters.

With Chinese, for example, there are over 200 common Chinese radicals, many of which have multiple forms. For a standard exemplary index of these radicals, reference is hereby made to the inside front and rear covers of "Reading & Writing Chinese Simplified Character Edition—A Comprehensive Guide to the Chinese Writing System," by William McNaughton (hereinafter "McNaughton"), which are hereby incorporated herein by reference in their entireties. McNaughton lists 227 modern Chinese radicals on the inside front cover and 214 traditional Chinese radicals on the inside rear cover. Most of these radicals appear in various forms when used by Chinese writers. For example, the second of the Modern Chinese radicals having the meaning "one," is shown in its various forms in the second entry to the chart of FIG. 9 (which illustrates 245 different inventor-selected radicals and their corresponding visually similar forms in separate four-part matrices, each matrix having an upper part and three lower parts).

Figure 9D:
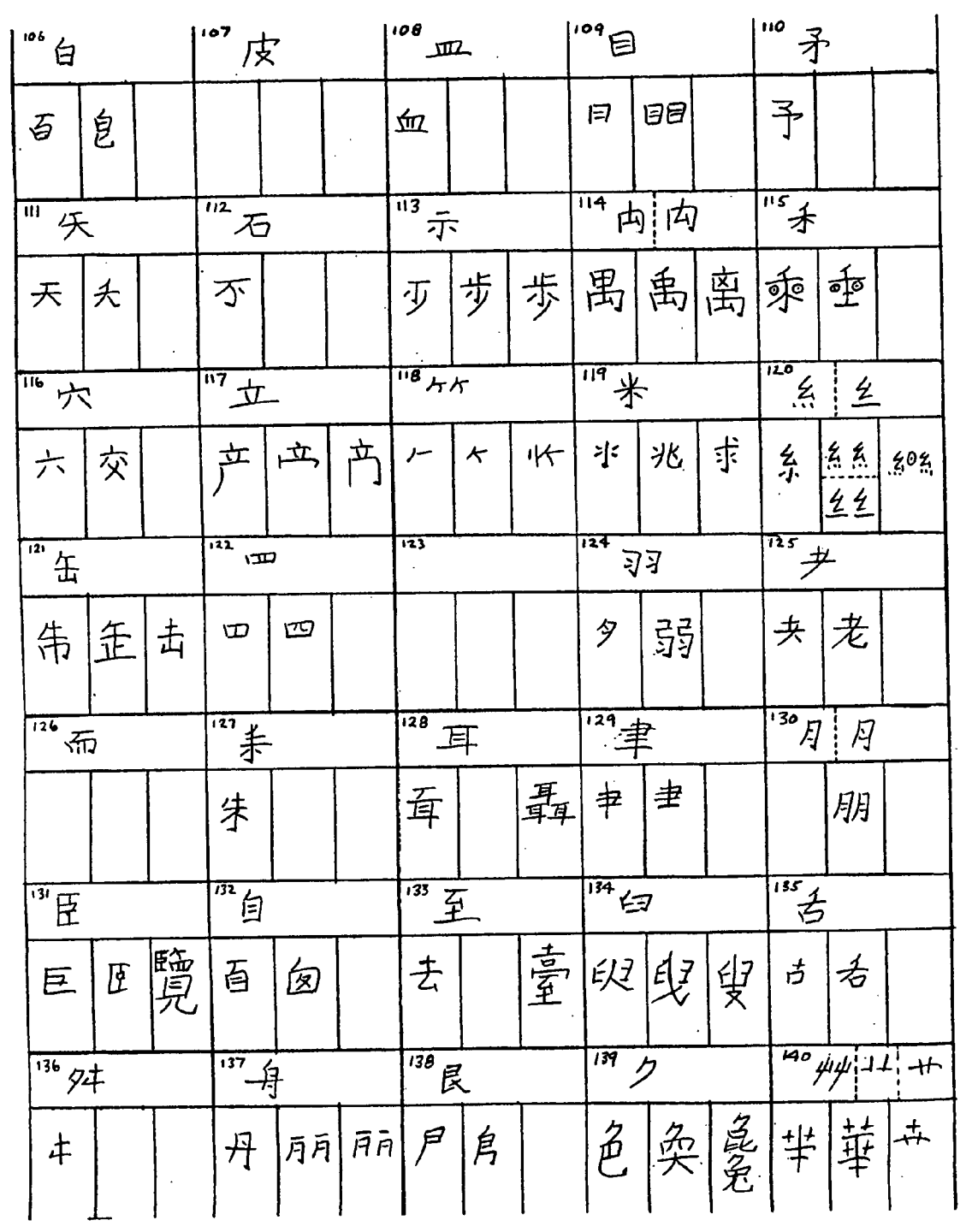

One question that can be asked in the Key-Symbol System is how to differentiate between, for example, the three variations 末 未 本 of the Chinese symbol 木 (see traditional Chinese radical 75 in the rear cover of McNaughton and radical 75 in FIG. 9). This Symbol (referred to as a Source below) has various meanings, including "tree" and "arbor". Each of the three variations is very close in appearance to the Symbol but they have substantially different meanings ("end", "not yet", and "root/origin", respectively). The similar appearance allows them to be associated with the Symbol for "tree"/ "arbor" and, accordingly, also be associated with the same two bridges TR and AR, with the intersection of the horizontal stroke being located at different points on the ARbor radical, the different intersection heights providing a basis for distinguishing these three Icons from one another.

With such variations in single Characters, the Key-Symbol System can be expanded to address these and other concerns using a Source-Icon System, a subdivision of and/or a complement to the Key-Symbol System.

The Key-Symbol System selects an English word (the Key) and its Bridge (the one-, two-, or three-letter abbreviation of the Key) and joins them to a given Character to form a trio. (See the Symbol-Key-Bridge diagram above.)

In the Source-Icon System, the Symbol of the Trio is considered as a "Source" for other symbols that resemble it or that, in some way, form a pattern with the Symbol. These other symbols are referred to as "Icons"—or reflections—of the Source. Each Source can be theoretically understood as "generating" three Icons.

Flowing from this logical grouping is an understanding that the Icons are to be included in the same Trio as the Source and, therefore, will share the same Key and Bridge of the Source. There exists a need to distinguish between the Key-Bridge of the Source and the Key-Bridge of each of the three Icons and it is the Source-Icon System that provides the ability to do so.

The Source-Icon System modifies the Bridge (and, thereby, the Key) by taking advantage of the upper- and lower-case forms of each of the two letters within the Bridge. Binary logic of upper and lower case letters provides four possible configurations for a two-letter Bridge. Using the Bridge "ST", for example, generates the following four possibilities: "ST", "St", "st", and "sT". The Source-Icon takes advantage of this definite set to associate the single Source from the three possible Icons associated with that Source.

To provide a particular example for this association, the Chinese Character for "daytime," 日, is used. (It is noted that this Character also means "sun".) The Bridge for the English word "daytIMe" is IM having two upper case letters. (It is noted here that, in the Source-Icon System, the Bridge for the Source is always two upper-case letters.) The three other possible case configurations are: "Im" (upper-lower), "im" (lower-lower), and "iM" (lower-upper). Three symbols that resemble the daytIMe symbol are 曰 日 曰. A natural pattern can be formed from this organization and is represented in the following matrix:

| | daytIMe ☐ | |
|---|---|---|
| 巳 | 白 | 甲 |
| Im | im | iM |

Moving from left to right, the different vertical stroke "slides" from the upper position to the middle position, to the lower position. In this way, each Icon can be called forth in the student's mind by using the two-letter Bridge associated with each of the three Icons. The daytIMe radical is represented by the Bridge IM in two capital letters. The three other possibilities for representing the Bridge IM are Im, im, and IM. These can be referred to by a student as eye-em-1, eye-em-2, and eye-em-3 or, if preferred, daytime-1, daytime-2, and daytime-3. ☐ is the parent radical (i.e., the Source) and, therefore, can be expressed as eye-em-zero or daytime-zero, or just IM-zero.

Because the three look-alikes are Icons, they can be referred to in a very general sense as I-1, I-2, and I-3 (I-zero would be the Source in this case).

At this point, the Key-Bridge System can be used to create mnemonics or Memory Jogger Sentences as set forth above, but with the four possible lower-upper-case Bridges combining the two letters within the Bridge of the Source. The following chart includes 3 complex Characters including the simple characters 氵(wATer), ☐(INgest), and 木(ARbor).

| Kanji | Pronunciation | Translation | Memory Jogger Sentence |
|---|---|---|---|
| 油 | yó | oil, grease | wATer is Immixable with oil or grease. |
| 呻 | shēn | to groan | i'M groanINg. |
| 柙 | shyá | a cage or pen | i'M in A Round cage. |

FIG. 9 is an exemplary illustration of 238 different Symbol Sources for various Chinese Characters and the one, two, or three Icons associated with the respective Source. The 72$^{nd}$ Source on page 3 of FIG. 9, for example, illustrates the matrix for the Symbol ☐ and the 75$^{th}$ Source on that same page of FIG. 9 illustrates the matrix for the Symbol 木. As can be seen in FIG. 9, some of the matrices (which substantially correspond to the most well-known Chinese radicals) are not filled with Icons because they are left open for a student's own personal use.

In the Key-Symbol System, the ideograph is referred to as a Symbol. This term tells a student what the ideograph is, such as a symbol or picture of something like a sun, a heart, a hill, a mouth. However, when the ideograph is referred to in the Source-Icon System as a Source, the description is telling the student how it behaves (not what it is). A Source is, therefore, a starting place for something else and generates that something. In other words, the Symbol is like the anatomy of the ideograph and the Source is like its physiology. If an ideograph is a source, it generates something similar to itself, like I-1, I-2, and I-3. It is that physical similarity that allows the student to memorize the group of Icons. These Icons are, then, put into a logical sequence that becomes a second memory aide. It may be high-to-low (see matrix 72 in FIG. 9), simple-to-complex (see matrices 12 and 105), or one-to-many (see matrices 28 and 29).

The Source can be considered as generating the characters that are grouped together with it. The meanings (i.e., translations) need not be similar in a given group. Instead, they are grouped based upon their physical resemblance. The Icons for ARbor form such a physical example regardless of meaning. The meanings of TR-1 (end), TR-2 (not yet), and TR-3 (origin) are not similar to the meaning of TR-0 (tree). However, the Icons physically resemble the Source so well that the grouping will aid a student in remembering them. This construction is different from the pattern followed in Key-Symbol System. There, the process matched up a Symbol with its translation. In the Source-Icon System, a Symbol is matched with other look-alike Symbols. The term Icon is applied to these look-alikes because they are—like computer icons—small pictures. Just as a computer icon brings up a larger program, these Icons announce that they are all members of a larger family.

Another example applying both the Key-Symbol and Source-Icon Systems uses the Chinese complex Character for turban 帽. The English translation for the first of these two Characters is "NApkin" and the second is the Ar-1 Icon of the ARbor Key. So, the Bridges for this complex Symbol are NA and Ar. Therefore, the following chart is generated:

| Symbol | Transliteration | English | Memory Jogger Sentence |
|---|---|---|---|
| 帽 | mwò | turban | a turban is like A round bandaNA. |

In the student's mind's eye, the student pictures a bandana being coiled around a head to form a turban. When it comes time to write the word, the script that runs through the student's mind can be:

In my Memory Jogger Sentence
the "N" and "A" in bandaNA was NA-0; and
the "A" and "r" of A round was AR-1.

NA is napkin, napkin is 巾. Therefore, the word mwò, turban, has a first Character equal to 巾.
Ar-1 is the second Character of turban and "Ar" is arbor-one: 木.

By writing down this process, the Student uses all of his/her senses, like feeling it with his/her fingers. The student looks at it, says it out loud to hear it, and repeats the process until the sentence is committed to memory.

Another example of a complex Chinese Character that uses Symbols already mentioned above is the Character 味-wèy, meaning taste, flavor, or smell. This Character is derived from the two simple Characters for "ingest" and the arbor-2 Icon. So, the two Bridges that are needed to construct this Character in the Source-Icon System are IN and ar.

| Symbol | Transliteration | English | Memory Jogger Sentence |
|---|---|---|---|
| 味 | wèy | taste | I Never taste garlic. |

An example Chinese complex Character using a aR-3 word is the complex Character 粗, which is translated into the English word "rough." The first simple character of this complex Character means "man" and the second simple character is the Icon aR-3. Therefore, the two Bridges for this complex Character are MA and aR. To create a Memory Jogger Sentence, the following exemplary association is provided.

| Symbol | Transliteration | English | Memory Jogger Sentence |
|--------|-----------------|---------|------------------------|
| 夲 | běn | rough | a Rough MAterial. |

It is noted that using the Bridge AR for the word "arbor" is not the only Bridge possible for that Symbol. Another meaning for the Symbol is "tree". Thus, an alternative Bridge for this Symbol is TR. But, it has been found that Memory Jogger Sentences can be formed easier if the Bridge has vowel as the initial letter. Thus, for the most common radicals it would be better to use the "vowel-Bridge" AR instead of a "consonant-Bridge" TR.

There is another possible alternative for Bridges where the Bridge does not form the first two letters of the Key. For example, the Key "arbor" has the two-letter combination "AR" as its Bridge. Another possible alternative is to use a middle set of two letters in the Key as the Bridge. For example, the English word "water" can use the Bridge "AT" instead of "WA".

In such a case, it will be easier for the student to make a Memory Jogger sentence with the letters "AT" than with the letters "WA".

To demonstrate the flexibility of the Key-Symbol System, an example regarding a character that is similar in both Chinese and Japanese is provided in the following text.

The traditional Chinese radical 213 was pronounced "gu ī" and meaning "tortoise". This form was taken up by the Japanese and simplified to pronounced "kame" and also meaning "tortoise." In 1957, the People's Republic of China instituted a revamping of its entire character system to modernize the characters. It further simplified radical 213 to The Key and Bridge for this Symbol are tortoise and OI. These three forms coexist side-by-side and are currently used.

The student accepts whichever form corresponds to the course he or she is studying—Classical or Modern Chinese, Korean, Japanese, or even Vietnamese and attaches "tortoise" and "OI" to that form. Indeed, there is no impediment to learning all three as, no doubt, the professional linguist would. It would also encourage the student of one form to learn the other forms and, thereby, enhance his or her knowledge of Asian linguistics and stimulate interest in learning other Asian languages because the student already has a head start.

Other radicals have undergone similar three-fold changes from Classical Chinese to Japanese to Modern Chinese. The following are merely three examples of such changes.

Radical 210: 

Radical 211: 

Radical 212: 

The Symbol is pronounced "watakushi" in Japanese and "sa" in Korean. It means "I" in Japanese and "selfish, personal, or private/privacy" in Chinese and Korean. The left-hand radical in this complex Symbol is translated into the English word AGriculture (or AGri for short) and has the Bridge AG. The right-hand radical in this complex Symbol is translated into the English word SElfish and has the Bridge SE. The Japanese or Korean student will learn in an exemplary fashion as set forth below.

If a Japanese student likes boating, he or she might generate the following as a Memory Jogger Sentence: "i am an AGgressive SEafarer".

For the Korean student, the word for "privacy" can use the following Memory Jogger Sentence: "privacy during SEx is AGeless."

Applying the Key-Symbol System along with the Source-Icon System can dramatically improve a student's speed in learning a character-based language.

I claim:

1. A key-symbol dictionary for learning multi-radical words in a Chinese-character-based language having a set of Chinese radicals, comprising:
    key-symbol pages each respectively associated with a single Chinese radical within the set of Chinese radicals and having thereon:
        the single Chinese radical as a symbol;
        a single keyword corresponding to a given meaning of the single Chinese radical, the single keyword:
            being in a user's language and having letters in the user's alphabet; and
            including therein a bridge comprised of at least one of the letters; and
        a list of memory joggers, each memory jogger being a word in the user's language containing at least the bridge, the list of memory joggers being selected such that a multi-radical word having at least two of the Chinese radicals can be recognized with a mnemonic formed from one memory jogger from each page corresponding to each of the at least two of the Chinese radicals; and
    the key-symbol pages being ordered alphabetically based on a spelling of the bridge associated with each key-symbol page.

2. The key-symbol dictionary according to claim 1, further comprising:
    a user radical dictionary section containing a list of user-recognized radicals within the set of Chinese radicals, each entry in the list of user-recognized radicals having thereat:
        the keyword associated with the respective single Chinese radical;
        the bridge associated with the keyword in the key-symbol page for the respective single Chinese radical; and
        each entry in the list of user-recognized radicals being ordered alphabetically based on a spelling of a respective one of the associated bridges; and
    a user multi-radical dictionary section containing a list of user-recognized multi-radical words, each entry in the list of user-recognized multi-radical words having:
        a written form of the multi-radical word containing at least two of the user-recognized radicals;
        a written form of the meaning of the multi-radical word in the user's language;
        the bridge entry for each of the at least two of the user-recognized radicals within the multi-radical word;
        a mnemonic in the user's language for recalling the written form of the multi-radical word, the mnemonic being based upon at least one memory jogger for each of the user-recognized radicals within the multi-radical word; and
        each entry in the list of user-recognized multi-radical words being ordered alphabetically based first on a spelling of a first bridge associated with a respective one of the user-recognized multi-radical words.

3. The key-symbol dictionary according to claim 1, wherein the bridge in each memory jogger word is emphasized such that the bridge visually stands out from the remainder of the letters in the word.

4. The key-symbol dictionary according to claim 3, wherein the bridge is emphasized with a different typeface than the remainder of the letters in the word.

5. The key-symbol dictionary according to claim 1, wherein the bridge is comprised of at least two letters of the single keyword.

6. The key-symbol dictionary according to claim 5, wherein the bridge is comprised of the first two letters of the single keyword.

7. The key-symbol dictionary according to claim 1, wherein each of the Chinese radicals is defined as a source having at least one icon associated therewith, the at least one icon being a Chinese character having a physical similarity to the source.

8. The key-symbol dictionary according to claim 7, wherein the physical similarity includes one of a visual similarity, a multiple occurrence similarity, and a similarity in meaning.

9. The key-symbol dictionary according to claim 8, wherein the at least one icon is three icons.

10. The key-symbol dictionary according to claim 9, wherein:
the bridge corresponds to two letters of the single keyword;
the source is associated with the two letters of the bridge in upper case, the source including at least three variations:
a first letter in upper case and a second letter in lower case;
the first letter in lower case and the second letter in lower case; and
the first letter in lower case and the second letter in upper case; and
the three variations of the source are associated with a respective one of the three icons.

11. The key-symbol dictionary according to claim 10, wherein the source and the three icons associated with the source are presented in a four-part matrix, each of the four parts corresponding to one of the source and the three variations.

12. The key-symbol dictionary according to claim 1, wherein the Chinese radicals include one of modern Chinese radicals and traditional Chinese radicals.

13. The key-symbol dictionary according to claim 1, wherein the Chinese-character-based language is selected from at least one of the group consisting of Japanese, Korean, Mandarin, Fu, Cantonese, Amoy Hokkien, Taiwanese, Thai, Vietnamese, and Singaporean.

14. The key-symbol dictionary according to claim 1, wherein the user's language is one of a Latin alphabet-based language and a transliteration of a non-Latin alphabet-based language.

15. The key-symbol dictionary according to claim 14, wherein the user's language is one of Spanish, Portuguese, French, Italian, German, Russian, Greek, Hebrew, Aramaic, and Arabic.

16. The key-symbol dictionary according to claim 2, wherein the user-recognized radicals include Chinese characters.

17. A key-symbol dictionary for learning multi-radical words in a Chinese-character-based language having a set of Chinese radicals, comprising:
key-symbol pages each respectively associated with a single Chinese radical within the set of Chinese radicals and having thereon:
the single Chinese radical as a symbol;
a single keyword corresponding to a given meaning of the single Chinese radical, the single keyword:
being in a user's language and having letters in the user's alphabet; and
including therein a bridge comprised of at least one of the letters; and
a list of memory joggers, each memory jogger being a word in the user's language containing at least the bridge, the list of memory joggers being selected such that a multi-radical word having at least two of the Chinese radicals can be recognized with a mnemonic formed from one memory jogger from each page corresponding to each of the at least two of the Chinese radicals; and
the key-symbol pages being ordered alphabetically based on a spelling of the bridge associated with each key-symbol page;
a user radical dictionary section containing a list of user-recognized radicals within the set of Chinese radicals, each entry in the list of user-recognized radicals having thereat:
the keyword associated with the respective single Chinese radical;
the bridge associated with the keyword in the key-symbol page for the respective single Chinese radical; and
each entry in the list of user-recognized radicals being ordered alphabetically based on a spelling of a respective one of the associated bridges; and
a user multi-radical dictionary section containing a list of user-recognized multi-radical words, each entry in the list of user-recognized multi-radical words having:
a written form of the multi-radical word containing at least two of the user-recognized radicals;
a written form of the meaning of the multi-radical word in the user's language;
the bridge entry for each of the at least two of the user-recognized radicals within the multi-radical word;
a mnemonic in the user's language for recalling the written form of the multi-radical word, the mnemonic being based upon at least one memory jogger for each of the user-recognized radicals within the multi-radical word; and
each entry in the list of user-recognized multi-radical words being ordered alphabetically based first on a spelling of a first bridge associated with a respective one of the user-recognized multi-radical words.

* * * * *